W. ROLLINS, C. K. SEYMOUR, AND J. A. SARGENT.
VEHICLE LOCK.
APPLICATION FILED JAN. 16, 1920.
1,415,401.
Patented May 9, 1922.
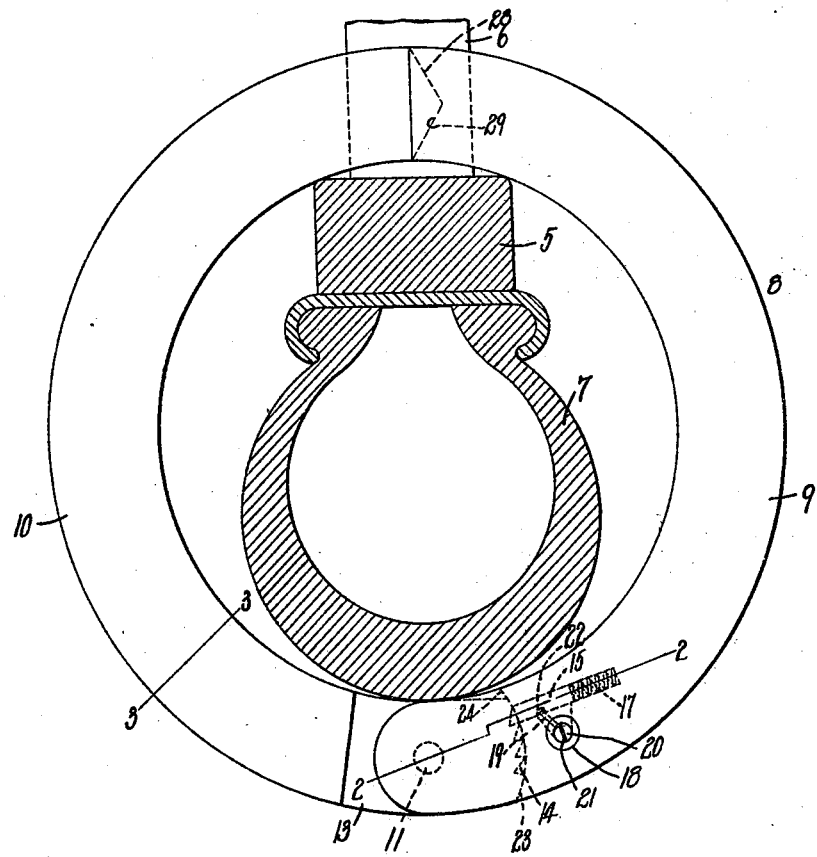
Fig. 1.
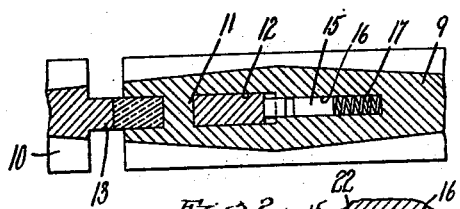
Fig. 2.
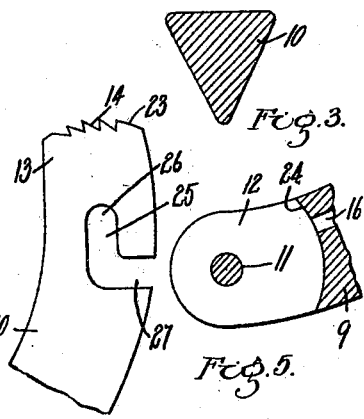
Fig. 3.
Fig. 5.
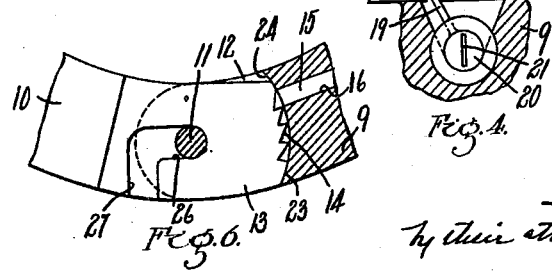
Fig. 6.
Fig. 4.
Inventors:
Wingate Rollins,
Clinton K. Seymour
John A. Sargent
by their attorney, Charles N. Gooding.

UNITED STATES PATENT OFFICE.

WINGATE ROLLINS, OF HYDE PARK, CLINTON K. SEYMOUR, OF WINCHESTER, AND JOHN A. SARGENT, OF CAMBRIDGE, MASSACHUSETTS.

VEHICLE LOCK.

1,415,401.  Specification of Letters Patent.  Patented May 9, 1922.

Application filed January 16, 1920. Serial No. 351,917.

*To all whom it may concern:*

Be it known that we, WINGATE ROLLINS, CLINTON K. SEYMOUR, and JOHN A. SARGENT, citizens of the United States, residing, respectively, at Hyde Park, in the county of Suffolk, Winchester, in the county of Middlesex, and Cambridge, in the county of Middlesex, all in the State of Massachusetts, have invented new and useful Improvements in Vehicle Locks, of which the following is a specification.

This invention relates to a device adapted to be attached to the wheel of a vehicle for preventing the same from being stolen without attracting attention to the fact.

The object of the invention is to provide a device of the character described which can be readily attached to the rim of a vehicle wheel whether said wheel be a spoke wheel, a wire wheel, or a solid wheel.

The object of the invention is further to provide a device of the character set forth which is effective to produce the desired result, no matter in what position it may be placed upon the rim of the wheel.

The object of the invention is further to provide a device of the character set forth which can be positioned upon the rim of a wheel and locked thereon without the use of a key but which necessitates the use of a key to remove it therefrom, so that the same may be quickly and easily snapped on to a wheel regardless of the style or size of the wheel and its tire.

The invention consists in a device of the character set forth comprising two members hinged to each other and provided with means whereby the free ends of said members may be locked in fixed position relatively to each other, either with their free ends engaging each other or with their free ends spaced apart.

The invention further consists in the combination and arrangement of parts set forth in the following specification and particularly pointed out in the claims thereof.

Referring to the drawings:

Figure 1 is a front elevation of our invention showing the same in position upon a vehicle wheel rim and tire with said rim and tire illustrated in section.

Fig. 2 is a detail section taken on line 2—2, Fig. 1.

Fig. 3 is a detail transverse section taken on line 3—3, Fig. 1.

Fig. 4 is a detail sectional elevation enlarged of the locking pawl and the rotary member of the lock with its projecting arm.

Fig. 5 is a sectional elevation of the end portions of the lock members showing the same separated.

Fig. 6 is a similar sectional view showing the lock members connected together.

Like numerals refer to like parts throughout the several views of the drawings.

In the drawings, 5 is the rim of a vehicle wheel, 6 a spoke of said wheel, 7 a tire attached to said rim, 8 is the device of our invention consisting of two members 9 and 10 hinged together by means of a pivot 11, which may be integral with the member 9 or electrically welded or riveted thereto. The member 9 is slotted at 12 to receive the end 13 of the member 10; said end 13 is provided at its rear edge 23 with ratchet teeth 14, thus constituting a segmental ratchet. The rear edge 23 of the end 13 is concentric with the pivot 11 and the outer edges of the ratchet teeth 14 are also concentric with said pivot and when the parts are assembled said rear edge 23 bears against the concave end 24 of the slot 12 so that any thrust of said locking members toward each other at their locking ends will be taken by the rear edge 23 and the concave end 24 and the said thrust will not be taken necessarily by the pivot 11 alone.

The end 13 of the member 10 is provided with an angle slot 25 preferably this slot is substantially right angled and the portion 26 of said slot extends circumferentially of the member 10, while the portion 27 of said slot extends substantially transversely of the member 10 and opens out through its outer edge.

In assembling the two members 9 and 10 of the lock they are placed in the relative positions illustrated in Fig. 5, the member 10 is then moved toward the member 9 and the pivot 11 enters the portion 27 of the slot 25. Said member 10 is then dropped down upon the pivot 11 so that said pivot enters the portion 26 of the slot 25 and then the member 10 is rocked upon the pivot 11 until the two members are brought into the relative positions illustrated in Fig. 6.

If desired, the portion of the slot not filled by the pivot 11 may be filled by lead or other soft fusible metal to prevent dirt from entering the slot and also to present a finished and workmanlike appearance.

The teeth 14 are adapted to be engaged by a locking pawl 15 which is arranged to slide in a hole 16 provided in the member 9 and is normally held in contact with the teeth 14 by a spring 17. A lock 18 of well-known construction is inserted in the member 9 and extends transversely thereof; said lock has the usual tumblers and has an arm 19 connected to the rotary member 20 of said lock. A key is inserted in the usual manner in a slot 21 in the rotary member 20 to enable said rotary member 20 to be rotated. The arm 19 on said rotary member projects into a notch 22 in the bolt 15 so that when the key is turned toward the right, Fig. 1, the pawl 15 will be withdrawn from engagement with the teeth 14 and the members 9 and 10 can then be swung upon their pivot 11 to cause their free ends to separate and the device can then be removed from the wheel.

In placing the device on the wheel, the free ends of the members 9 and 10 are spaced apart sufficiently to enable said ends to clear the tire and the free ends of the members 9 and 10 are then pressed toward each other until, in the case of a wheel with spokes, they may engage each other as illustrated in Fig. 1; or, if it be a solid wheel, the free ends of the members 9 and 10 are pressed toward each other until they engage the web of said solid wheel; and in the case of a wire wheel, they are also pressed toward each other until they are properly positioned, but are left locked on the solid wheel with their adjacent ends spaced apart.

It will be seen, therefore, that this device is equally applicable to spoke wheels, solid wheels or wire wheels and that it may be attached to different sizes of wheels or to wheels having different widths of rims and different transverse diameters of tires with equal facility and securing the same result, namely, that a vehicle with one of these locks attached thereto cannot be stolen without the theft being discovered by anyone who sees the vehicle being driven with this vehicle lock attached to the wheel.

It will be noted that the free end 28 of the member 10 projects into a recess 29 in the member 9. This construction assists in preventing the free ends of said members 9 and 10 from being thrown out of alignment and also such construction prevents the insertion of a tool with the object of forcing the free ends of the members 9 and 10 apart.

We claim:

1. A vehicle lock having, in combination, two members hinged together and adapted to be positioned upon the rim of a vehicle wheel and means on one of said members adapted to engage the other of said members to lock said members in fixed relation to each other with their free ends spaced apart.

2. A vehicle lock having, in combination, two members hinged together and adapted to be positioned upon the rim of a vehicle wheel and means on one of said members adapted to engage the other of said members to lock said members in fixed relation to each other with their free ends spaced apart, or with their free ends engaging each other.

3. A vehicle lock having, in combination, two members hinged together and adapted to be positioned upon the rim of a vehicle wheel and means on one of said members adapted to engage the other of said members adjacent to the hinged ends of said members adapted to lock said members in fixed relation to each other.

4. A vehicle lock having, in combination, two members hinged together and adapted to be rotatably mounted upon the rim of a vehicle wheel and means on one of said members adapted to engage the other of said members to lock said members in fixed relation to each other with their free ends spaced apart.

5. A vehicle lock having, in combination, two members hinged together and adapted to be rotatably mounted upon the rim of a vehicle wheel and means on one of said members adapted to engage the other of said members to lock said members in fixed relation to each other with their free ends spaced apart or with their free ends engaging each other.

6. A vehicle lock having, in combination, two members hinged together and adapted to be rotatably mounted upon the rim of a vehicle wheel and means on one of said members adapted to engage the other of said members adjacent the hinged ends of said members adapted to lock said members in fixed relation to each other.

7. A vehicle lock having, in combination, two members hinged together and adapted to be positioned upon the rim of a vehicle wheel and means on one of said members adapted to engage the other of said members adjacent the hinged ends of said members adapted to lock said members in fixed relation to each other with their free ends spaced apart.

8. A vehicle lock having, in combination, two members hinged together and adapted to be positioned upon the rim of a vehicle wheel and means on one of said members adapted to engage the other of said members adjacent the hinged ends of said members adapted to lock said members in fixed relation to each other with their free ends spaced apart or with their free ends engaging each other.

9. A vehicle lock having, in combination, two members hinged together and adapted to be positioned upon the rim of a vehicle wheel and means on one of said members adapted to engage the other of said members to lock said members in fixed relation to each other, comprising a segmental ratchet on one of said members and a spring actuated pawl on the other of said members adapted to engage said ratchet.

10. A vehicle lock having, in combination, two members hinged together and adapted to be positioned upon the rim of a vehicle wheel and means to lock said members in fixed relation to each other, comprising a segmental ratchet on one of said members and a spring actuated pawl on the other of said members adapted to engage said ratchet and means to lock said pawl in engagement with said ratchet.

11. A vehicle lock having, in combination, two members hinged together and adapted to be positioned upon the rim of a vehicle wheel and means to lock said members in fixed relation to each other, comprising a segmental ratchet on one of said members and a spring actuated pawl on the other of said members adapted to engage said ratchet and means to throw said pawl out of engagement with said ratchet.

12. A vehicle lock having, in combination, two members connected together and adapted to be positioned upon the rim of a vehicle wheel and means on one of said members adapted to engage the other of said members to lock said members in fixed relation to each other with their free ends spaced apart.

13. A vehicle lock having, in combination, two members pivotally and detachably connected together and adapted to be positioned upon the rim of a vehicle wheel, and means on one of said members adapted to engage the other of said members to lock said members in fixed relation to each other.

14. A vehicle lock having, in combination, two members, a pivot on one of said members adjacent to one end thereof, the other of said members being provided with an angular slot opening out of one edge thereof and adapted to receive said pivot, whereby said members may be pivotally connected together and positioned upon the rim of a vehicle wheel, and means on one of said members adapted to engage the other of said members to lock said members in fixed relation to each other.

15. A vehicle lock having, in combination, two members, a pivot on one of said members adjacent to one end thereof, the other of said members being provided with an angular slot opening out of one edge thereof and adapted to receive said pivot, whereby said members may be pivotally and detachably connected together and positioned upon the rim of a vehicle wheel, and means on one of said members adapted to engage the other of said members to lock said members in fixed relation to each other.

In testimony whereof we have hereunto set our hands in presence of two subscribing witnesses.

WINGATE ROLLINS.
CLINTON K. SEYMOUR.
JOHN A. SARGENT.

Signed in the presence of:—
FRANKLIN E. LOW.